(12) United States Patent
Gaucas

(10) Patent No.: US 7,958,562 B2
(45) Date of Patent: Jun. 7, 2011

(54) DOCUMENT ACCESS MANAGEMENT SYSTEM

(75) Inventor: Dale E. Gaucas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1014 days.

(21) Appl. No.: 11/412,383

(22) Filed: Apr. 27, 2006

(65) Prior Publication Data

US 2007/0255743 A1 Nov. 1, 2007

(51) Int. Cl.
*G06F 17/30* (2006.01)
*G06F 21/00* (2006.01)
*G06F 3/00* (2006.01)

(52) U.S. Cl. .............. 726/28; 726/5; 713/182; 709/226; 715/751

(58) Field of Classification Search .......... 707/9; 726/5, 726/28; 713/182; 715/750–758; 709/226
See application file for complete search history.

(56) References Cited

U.S. PATENT DOCUMENTS

| | | | |
|---|---|---|---|
| 5,826,269 A * | 10/1998 | Hussey | 707/10 |
| 5,930,801 A * | 7/1999 | Falkenhainer et al. | 707/103 R |
| 6,092,203 A * | 7/2000 | Ooki et al. | 726/5 |
| 6,377,994 B1 * | 4/2002 | Ault et al. | 709/229 |
| 6,615,347 B1 * | 9/2003 | de Silva et al. | 713/156 |
| 2001/0051930 A1 * | 12/2001 | Nakamura | 705/56 |
| 2003/0115147 A1 * | 6/2003 | Feldman et al. | 705/64 |
| 2003/0225765 A1 * | 12/2003 | Frieden et al. | 707/9 |
| 2003/0233541 A1 * | 12/2003 | Fowler et al. | 713/155 |
| 2004/0064691 A1 * | 4/2004 | Lu et al. | 713/158 |
| 2004/0116115 A1 * | 6/2004 | Ertel | 455/426.2 |
| 2005/0203885 A1 * | 9/2005 | Chenevich et al. | 707/3 |
| 2005/0228680 A1 * | 10/2005 | Malik | 705/1 |

* cited by examiner

*Primary Examiner* — Kambiz Zand
*Assistant Examiner* — Michael Guirguis
(74) *Attorney, Agent, or Firm* — Miele Law Group PC

(57) ABSTRACT

In accordance with one embodiment, apparatus are provided including a document access arbiter, a guest access control mechanism, and a guest setup interface. The document access arbiter securely controls user access to a secured document repository. The guest access control mechanism provides, to guest users, selective access to respective select set of documents in the secure document repository. The guest users include users that do not have account holder access to the document repository. The guest setup interface presents, via a computer screen, guest parameter graphical tools to account holder users having account holder access to the repository.

20 Claims, 4 Drawing Sheets

DOCUMENT ACCESS MANAGEMENT SYSTEM

FIELD OF THE DISCLOSURE

Aspects of the present disclosure relate to systems for providing and managing access to document repositories.

BACKGROUND

Document repositories, for example, document management systems, provide users with access to various types of documents. A document management system may help businesses manage various types of media documents (audio, video, text, and so on, with varying file formats), and manage the contents of those documents. They may do this, for example, by allowing users throughout a given organization to readily locate and access documents and their content; maintaining and tracking versions of documents as they are modified, providing appropriate levels of access security; and/or providing ways for users to collaborate in their work and to communicate with each other, for example, with email features. The web-based Xerox DocuShare Enterprise Content Management (ECM) solution is one example of a document management system.

Some document repositories provide limited document access to account holders which have account holder access to the repository. In addition, account holders may, for certain documents within their control, provide guest access to those documents.

SUMMARY

In accordance with one aspect of the present disclosure, apparatus are provided, including a document access arbiter, a guest access control mechanism, and a guest setup interface. The document access arbiter securely controls user access to a secure document repository. The guest access control mechanism provides, to guest users, selective access to respective select sets of documents in the secure document repository. The guest users include users that do not have account holder access to the document repository. The guest setup interface is provided to present, via a computer screen, guest parameter graphical tools to account holder users having account holder access to the repository.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Certain terms used herein may be defined, for example, in embodiments herein, as follows. Multipurpose internet mail extension (MIME), in embodiments herein, may refer to a system or a standard by which a message body is structured in terms of body parts, each having a content type defining its structure and type. In embodiments herein, secure MIME (S/MIME) may, for example, mean a specification for conveying digitally signed or encrypted information in MIME. A public key infrastructure (PKI) may, in embodiments herein, refer to a system or infrastructure needed to support public-key-based technologies used on a scale using multiple users, or multiple systems.

A certificate authority (CA), in embodiments, may mean a network entity that issues a digital certificate. In embodiments, a digital certificate is, for example, a statement to a certificate user that a particular public key is bound to a particular entity, the entity being the certificate subject. In embodiments herein, a subject or certificate subject may, for example, mean a person, device, or other entity that holds the private key corresponding to the certified public key.

In embodiments herein, a public key, may, for example, be one of a pair of related keys in a public key encryption system. That pair of related keys includes one key for encryption and the other for decryption. One of the keys must be held securely, and is referred to as the private key. The other key may be held less securely, and is referred to as the public key.

Figure 1:
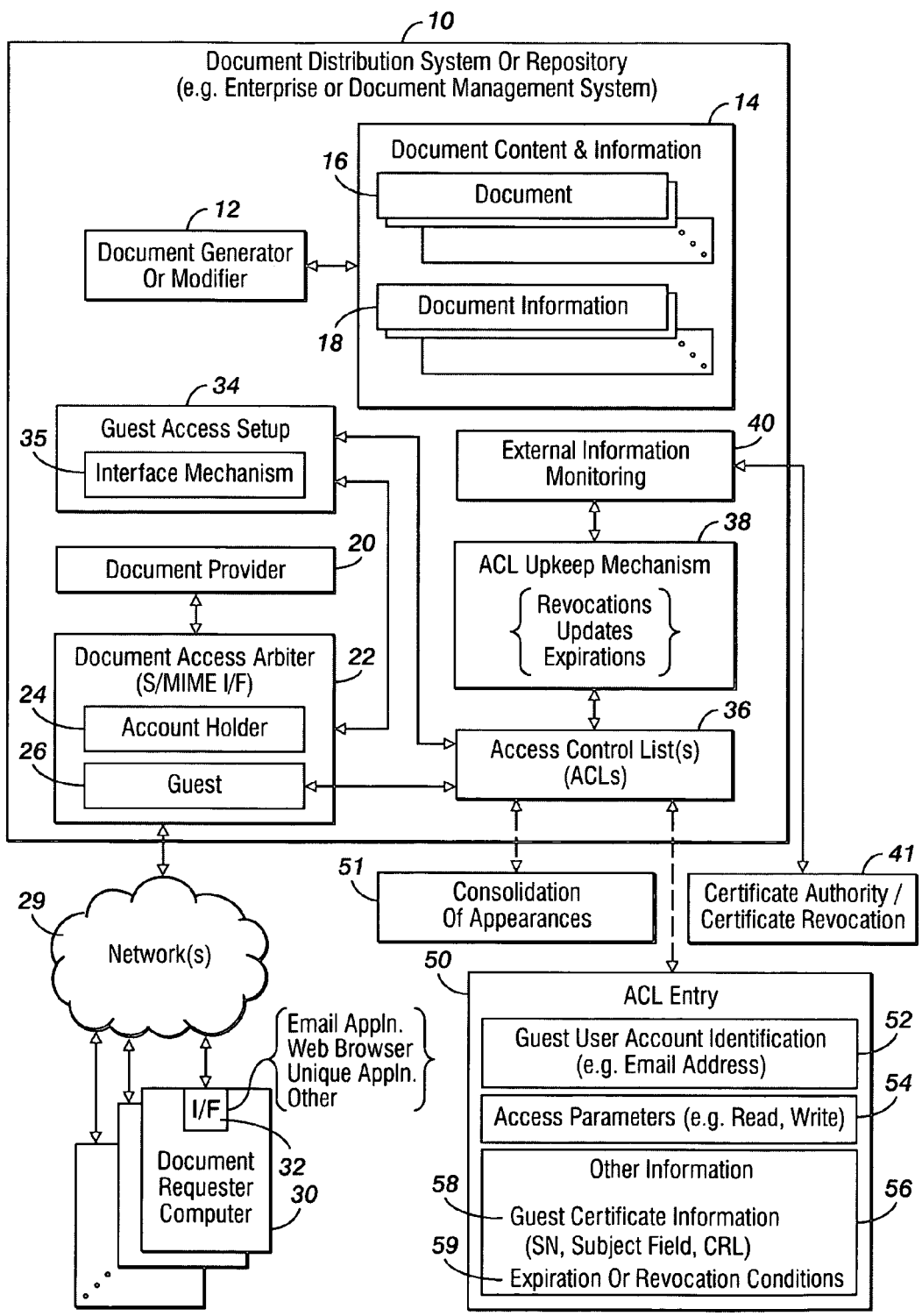
FIG. 1 is a block diagram of one embodiment of a document distribution system or document repository.

Referring now to the drawings in greater detail, FIG. 1 shows a block diagram of a document distribution system, for example, a document repository. The illustrated repository 10 may, for example, be an enterprise system or a document management system. One aspect of the disclosure concerns controlling guest access to documents in a document repository, where the guests are individuals that do not have account holder status with the document repository system. Another aspect of the disclosure is directed to providing a mechanism to allow account holder users that have access to the document repository system to give access to guests. The access provided to guests may be limited access. The access may be limited to either the same access or less access than that of the account holder. The type of access that is provided to the guest or guests may be access limited to a certain document or a certain set of documents (i.e., a collection of documents) identified by the account holder. The type of access that may be provided may be limited, for example, to only reading and/or writing. Different account access may be provided for different guest accounts.

The illustrated document repository system 10 includes a document generator or modifier 12 and a document content and information repository 14. The illustrated document and content information repository 14 holds documents 16 and document information 18 pertaining to those documents. The document information may, for example, include history concerning the documents, version information, and other format and overhead information concerning the documents.

The illustrated repository system 10 further includes a document provider 20, and a document access arbiter 22. The illustrated document access arbiter 22 securely controls user access to the illustrated secure document repository 10. In one embodiment, document access arbiter 22 includes an S/MIME interface. Unique access control mechanisms may be provided including an account holder access mechanism 24 and a guest access mechanism 26.

The illustrated guest access control mechanism 26 provides, to guest users, selective access to respective select sets of documents in the secure document repository 10. Those guest users include users that do not already have account holder access to the document repository 10.

Document account holder users and guest users access the illustrated repository system 10 via one or more networks (which may include the Internet) through the use of their respective document requester computers 30. Each document requester computer 30 may be provided with an interface component 32, which may include, for example, an email application, a web browser, an application uniquely created for interfacing with the repository system, or another mechanism. In the illustrated embodiment, the interface 32 includes at least an S/MIME email application.

The illustrated repository 10 further includes a guest access setup mechanism 34, one or more access control lists (ACLs) 36, an ACL upkeep mechanism 38, and an external information monitoring mechanism 40.

Guest access setup mechanism 34 includes an interface mechanism 35 to present, via a computer screen (e.g., the computer screen of a document requester computer 30), guest parameter graphical tools to account holder users having account holder access to repository system 10. ACLs 36 hold respective ACL entries 50 for guest users. Each ACL entry 50 includes a guest user account identifier 52, a set of access parameters for the guest 54, and other information pertaining to the guest 56, including, for example, guest certificate information 58, and conditions for expiration and revocation of a particular ACL entry 59. The guest user account identifier 52 may, for example, be the email address of a guest user. Access parameters 54 may, for example, include parameters indicating that access to a particular set of documents for that guest is either read only access or read and write access. The guest certificate information 58, may, for example, include the serial number, the subject field, and the certificate revocation link (CRL) all pertaining to the certificate for the given guest.

ACL upkeep mechanism 38 repeatedly performs certain upkeep and housekeeping functions relating to the ACL or ACLs 36. For example, ACL upkeep mechanism 38 manages revocations of entries in the ACL/ACLs, updates of the ACL entries, and expirations of entries. In order to manage revocations of ACL entries, an external information monitoring mechanism 40 may be provided, for example, to interface with certificate revocation mechanisms 41 that may be external to repository system 10. The certificate revocation mechanisms 41 may include one or more certificate revocation lists containing information indicating that a particular certificate has been revoked for a given guest.

Access control list or lists 36 may be further provided with a mechanism for consolidating appearances 51. For example, a number of ACL entries within access control list or lists 36 may correspond to the same guest email address. Consolidation of appearances mechanism 51 may include a mechanism to periodically process all ACL entries, and create a special guest user object for each email address that appears in plural entries. The email address in those entries with the common email address may be replaced with one user object. This will facilitate revocation checking by ACL upkeep mechanism 38, by causing the removal of one special guest user object due to revocation and further causing the updating of all corresponding ACL entries.

Document access arbiter 22 may further allow for account holder users to create guest accounts for other account holder users for specific guest access to certain documents or collections of documents. Accordingly, individuals with accounts on the repository system, who are authorized within access control list or lists 36 for a collection of documents or for a particular document, can permit such general guest read access to the contents of a particular collection or document by editing the ACL.

Request for repository access to repository system 10 may be via an S/MIME email interface, which verifies that the email address in the subject field of an accompanying trusted digital certificate appears in the access control list (ACL) 36 for the particular requested document or collection of documents.

Accordingly, a document system mail agent may be provided, for example, as part of document access arbiter 22, which authorizes an upload or download request, by verifying the digital signature of the signed email using the accompanying public key. The certificate authority trust chain for that key is then validated, and the accompanying signing certificate is checked to make sure it has not been revoked. The email address is extracted from the subject field of the signing certificate, and the corresponding document system account holder user account is looked up to associate the email address indicated in the email request with that particular account. If there is no user account associated with the email address, it may be assumed that a guest is attempting access.

Figure 2:
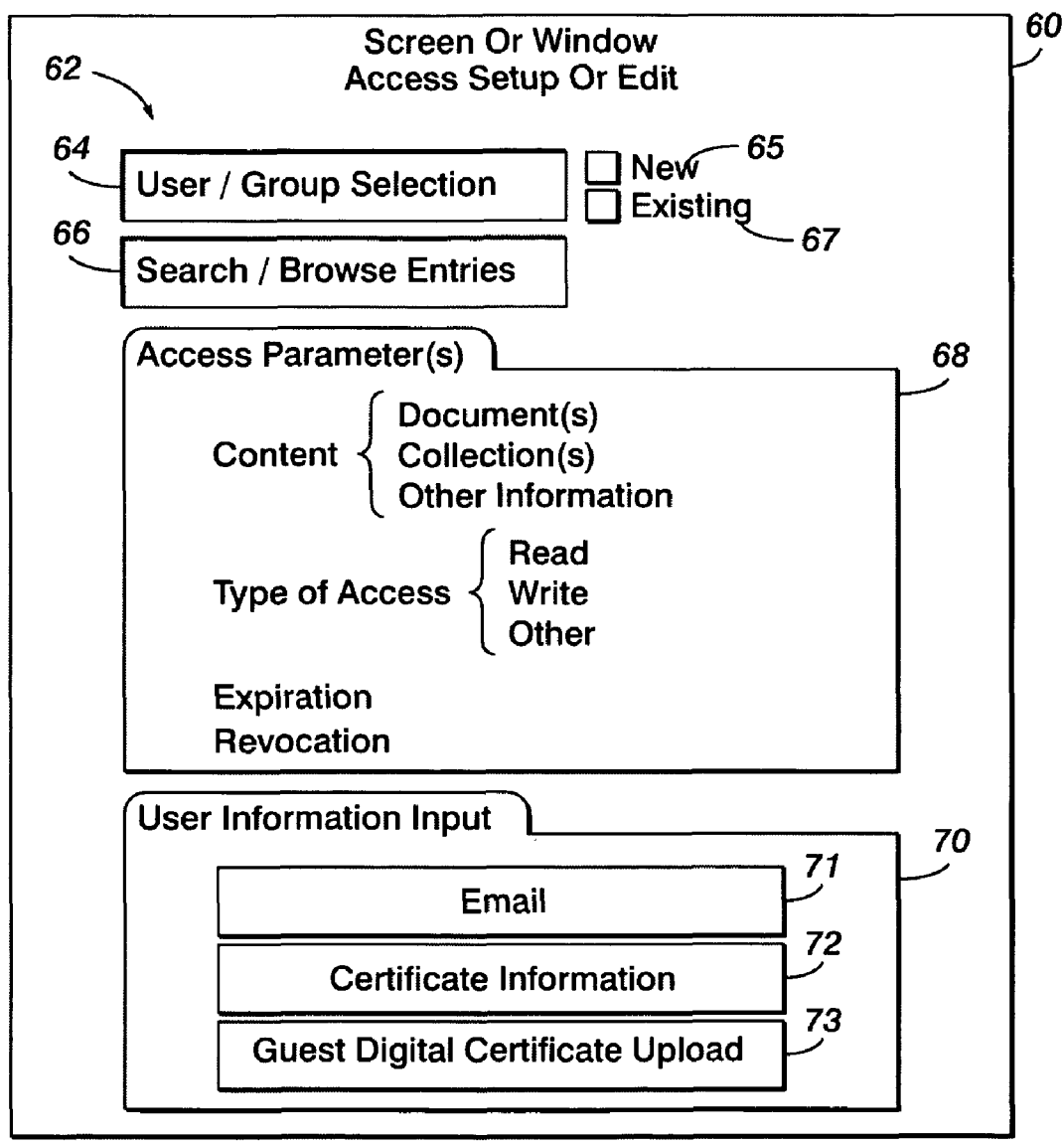
FIG. 2 is a functional schematic diagram of a screen or window for access setup or editing in accordance with an embodiment of the disclosure.

FIG. 2 is a schematic block diagram showing access setup or editing functions and interaction that may be presented by a screen or windows. The illustrated interface is provided to allow a number of functions to be performed by guest access setup mechanism 34 shown in FIG. 1. The interface illustrated in FIG. 2 is generated by interface mechanism 35, shown in FIG. 1.

The illustrated screen or window 60 includes a number of guest parameter graphical tools 62. A graphical tool may include, for example, a text display, and/or input element, a form, or an icon. The graphical tools may interact with positional cursers. Each graphical tool may allow for the presentation and/or inputting of information pertaining to its particular function. The illustrated guest parameter graphical tools 62 include a user/group selection graphical tool 64, a search/browse entries graphical tool 66, access parameter graphical tool 68, and user information input graphical tool 70. The user/group selection graphical tool 64 may include graphical tools to receive a selection by a user of a new guest user or group of guest users 65, or one or more existing guest users or groups of guest users 67. Search or browse entries graphic tool 66 may include a mechanism to allow a user to search for or browse access control information including access control entries, for example, by typing in text or by browsing among a presented menu list or file structure The illustrated access parameter or parameters tool 68 may allow for the presentation, for example, via a computer screen, and for the input of information pertaining to the content to be accessed, the type of access, expiration information concerning when that access will expire, and revocation information regarding when that access will be revoked. The content may include one or more documents, one or more collections of documents, and other information. The type of access may include read access, write access, and other types of access.

The user information input tools 70 may include mechanisms for inputting the email address of a guest user 71 and certificate information concerning email address 72. In addition, the user information input tools 70 may further include a guest digital certificate upload mechanism 73, to allow for the uploading of a guest digital certificate pertaining to the guest user.

Referring back to FIG. 1, in operation, in accordance with one embodiment, document access arbiter 22 includes an S/MIME email interface which authorizes an upload or download request submitting by a document requester via one or more networks 29. The email interface verifies a digital signature of a signed email sent by the document requester using an accompanying public key accompanying the email. The certificate authority (CA) trust chain for that key is validated by the email interface, and the email interface makes sure that the accompanying signing certificate has not been revoked, by the use of the external information monitoring mechanism 40 which communicates with the certificate revocation mechanisms 41, generally including certificate revocation lists.

Document access arbiter 22 extracts the email address from the subject field of the signing certificate that accompanied the email request. The corresponding account holder which holds an account with repository 10 is then identified based upon the email address, and the email address and the emailed request are both associated with the appropriate repository account. Document access arbiter 22 then checks to make sure that the account name for that account is in the access control list or lists 36 for the requested operation on the repository 10. If no account can be identified based upon the email address, then, in the example embodiment, the document access arbiter 22 assumes that a guest is attempting access.

Document access arbiter 22 may be configured to allow an owner of a collection of documents or a particular document to modify ACL 36 information pertaining to the collection or document, for example, by adding or deleting specific repository user account names to the list or lists 36. Such document or collection access account names added to the ACL/ACLs 36 may include other repository account holders or identifiers of guests that are not repository account holders.

A document requester using a document requester computer 30 may include a repository account holder or a guest that does not have an account holder status with repository 10. A guest without repository account status may send a signed emailed request to document access arbiter 22 via network(s) 29, as long as the signed email request includes a valid signature containing a signing certificate whose subject field contains an email address that is included in ACL/ACLs 36. The mail agent of document access arbiter 22 then checks to see if that email address is in the ACL for the requested repository collection or document.

Guests that do not hold account status with repository 10 may be added to ACL/ACLs 36 by account holder users. In the illustrated embodiment, the account holder users may determine that a particular guest's digital certificate belongs to a certificate authority that is trusted by the mail agent of repository 10. Should the guest be an account holder of another repository which has its own private certificate authority, document distribution system or repository 10 may be provided with a mechanism that supports recognition of the certificates issued by such a private certificate authority. Such certificate authorities of other repositories may be added to the list of trusted authorities of the mail agent.

In the illustrated embodiment, if a user account of repository 10 is removed then that user name will be automatically removed from any ACLs 36 containing that account information. The account holder users of repository 10 may be responsible for removing guest identifiers (guest email addresses in the embodiment) from ACLs 36 when their guest access is to be removed. Automatic removal of such email addresses of guests can be facilitated, for example, when the certificates for those guests have been revoked. This may be done by ACL upkeep mechanism 38, which determines when certificates are revoked by accessing certificate revocation mechanism 41 via the use of external information monitoring mechanism 40. The ACL entries 50 may include information that allows for the automatic removal of guest user entries. This information may include, for example, information obtained from the guest's certificate, for example, the serial number of the certificate, the certificate expiration date, and the certificate revocation list (CRL) URL.

With this additional information, ACL upkeep mechanism 38 can periodically check for ACL entries 50 that correspond to expired or revoked certificates, and subsequently remove those entries.

An account user holder may obtain the digital certificate of a guest in advance, and upload that digital certificate to repository 10, for example, in a custom guest certificate object that could be referenced by an ACL 36.

Figure 3:
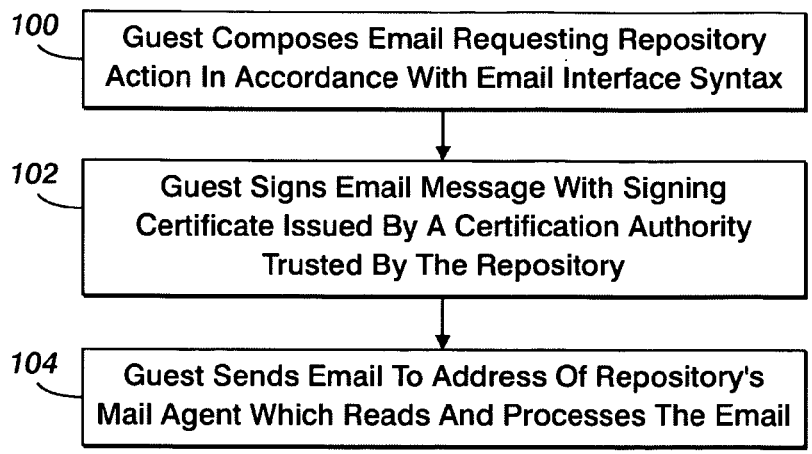
FIG. 3 illustrates a flow chart of a guest process.

FIG. 3 shows a flow chart of a guest process, by which a guest requests access to a document or a collection of documents via repository 10. In an act 100, the guest composes an email on his or her document requester computer 30. The email requests repository action in accordance with the email interface syntax required by document access arbiter 22. In a subsequent act 102, the guest signs the email message with a signing certificate issued by a certification authority (CA) trusted by repository 10. Thereafter, in act 104, the guest sends the email to the address of the repository's 10 mail agent, which reads and processes the email.

Figure 4:
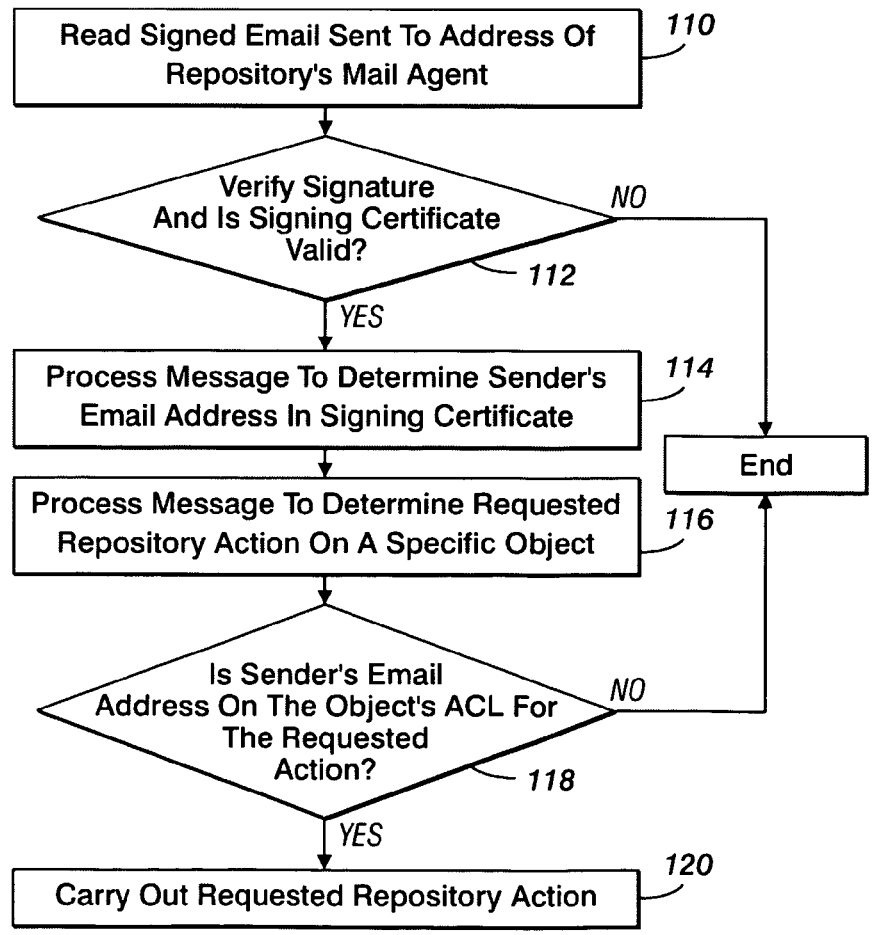
FIG. 4 illustrates a flow chart of a repository mail agent process.

FIG. 4 shows a flow chart of a repository mail agent process. In an act 110, the mail agent reads the signed email sent to the address of the repository's mail agent. Subsequently in act 112, the signature of the email is verified, and a determination is made as to whether the signing certificate is valid. When the signing certificate is valid, the process proceeds to act 114, where the message is processed to determine the sender's email address in the signing certificate. Subsequently, in act 116, the message is processed to determine the requested repository action on the specified object. In act 118, a determination is made as to whether the sender's email address is on the object's ACL 36 for the requested action. When the sender's email address is on the object's ACL for the requested action, the process proceeds to act 120, where the requested repository action is carried out.

Figure 5:
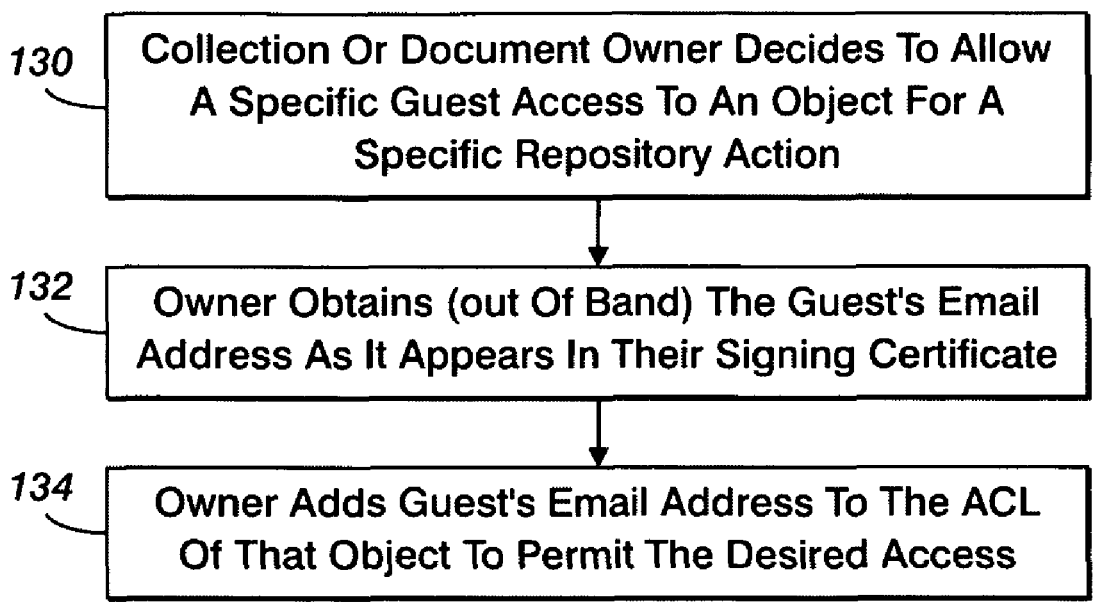
FIG. 5 illustrates a flow chart of a repository object owner process.

FIG. 5 shows a flow chart of a repository object owner process. Repository 10 may be configured to define ownership of a document or a collection of documents by, for example, an account holder, in different ways. For example, ownership of a document or collection may mean that the document or collection was created by that repository account holder. In addition, or alternatively, ownership of a collection or document may mean that the given account holder has edit rights to that collection or document. As another example, in addition or instead of other meanings, ownership of the collection or document may mean that the given account holder has non-account holder guest assignment rights for that collection or document.

FIG. 5 shows a flow chart of a repository object owner process. In act 130, a collection or document owner, using a document requester computer 30, decides to allow a specific guest access to an object for a specific repository action. Subsequently, in act 132, the account holder/owner obtains (out of band, i.e., outside of use of the system illustrated in FIG. 1) the guest's email address as it appears in their signing certificate. In act 134, the owner adds the guest's email address, through use of interface mechanism 35, to the ACL corresponding to the requested object to permit the desired access.

The processes or functions performed by the elements shown in the figures herein may be performed by a general purpose computer and/or by a special purpose computer. Such processing or functions may be performed by a single platform or by a distributed processing platform. Any data handled in such processing or created as a result of such processing can be stored in any type of memory. By way of example, such data may be stored in a temporary memory, such as in the random access memory of a given computer. In addition, or in the alternative, such data may be stored in longer-term storage devices, for example, magnetic disks, optical disks, and so on. For the disclosure herein, machine-readable media may include any form of data storage mechanism as well as hardware and circuit representations of the structures or data that a data storage mechanism might represent.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Apparatus comprising:
    a document access arbiter to securely control user access to a secure document repository;
    a guest access control mechanism to provide, to guest users, selective access to respective select sets of documents in the secure document repository, a given guest user among the guest users being a user that does not have account holder access to the document repository and that, before a given account holder with account holder access sets up the given guest user to have guest access via a guest setup interface, has no access to the document repository; and
    the guest setup interface to present, via a computer screen, guest parameter graphical tools to plural account holder users having only non-owner account holder access to the repository, the guest parameter graphical tools being configured to receive via a given one of the non-owner account holders interacting with the computer screen, for the given guest user, guest user identifying information identifying the given guest user and associated access parameters specifying a type of access to be given to the given guest user.

2. The apparatus according to claim 1, further comprising an access control list to hold respective access control list entries for a guest user, each entry including guest user identification information, access parameters, and guest trustworthiness information.

3. The apparatus according to claim 1, further comprising a secure document repository.

4. The apparatus according to claim 1, further comprising an enterprise application including the secure document repository.

5. The apparatus according to claim 3 wherein the secured document repository includes a document management system.

6. The apparatus according to claim 1, wherein the document access arbiter includes a mail agent that supports an email-based repository interface.

7. The apparatus according to claim 6, wherein the mail agent includes an S/MIME mail agent.

8. The apparatus according to claim 1, wherein the guest parameter graphical tools include a document graphical tool to allow a given account holder user to input, via the computer screen, a select set of documents.

9. The apparatus according to claim 8, wherein the guest parameter graphical tools includes a mechanism to allow the input, via the computer screen, of a select set of documents from among a set of documents owned by the given account holder.

10. The apparatus according to claim 8, wherein the guest parameter graphical tools further include a guest user graphical tool to allow the given account holder user to input, via the computer screen, guest user information.

11. The apparatus according to claim 10, wherein the guest user information includes access information.

12. The apparatus according to claim 10, wherein the guest user information includes a unique identifier identifying the guest user.

13. The apparatus according to claim 10, wherein the guest user information includes an identifier identifying the guest user and wherein the guest user information also includes trusted entity verification information verifying the identification corresponding to the identifier and verifying the trustworthiness of that entity.

14. The apparatus according to claim 13, wherein the guest user information includes certification authority information and certificate revocation list information.

15. The apparatus according to claim 14, wherein the identifier includes an email address of the guest user.

16. The apparatus according to claim 14, wherein the trusted entity verification information includes a unique identifier of a digital certificate and certificate revocation link information.

17. The apparatus according to claim 14, further comprising a cross-document repository management mechanism, including a local list within the document repository of private certification authorities of another document repository as trusted authorities.

18. The apparatus according to claim 2, further comprising an access control list upkeep mechanism to repeatedly remove, deactivate, or expire access control list entries that correspond to now revoked certificates.

19. A method comprising:
    securely controlling user access to a secure document repository;
    providing, to guest users, selective access to respective select sets of documents in the secure document repository, a given guest user among the guest users being a user that does not have account holder access to the document repository and that, before a given account holder with account holder access sets up the given guest user to have guest access via a guest setup interface, has no access to the document repository; and
    presenting the guest setup interface to account holder users to present, via a computer screen, guest parameter graphical tools to plural account holder users having only non-owner account holder access to the repository, the guest parameter graphical tools being configured to receive via a given one of the non-owner account holders interacting with the computer screen, for the given guest user, guest user identifying information identifying the given guest user and associated access parameters specifying a type of access to be given to the given guest user.

20. Machine-readable non-transitory media encoded with data, the encoded data being interoperable with a machine to cause:
    securely controlling user access to a secure document repository; providing, to guest users, selective access to respective select sets of documents in the secure document repository, a given guest user among the guest users being a user that does not have account holder access to the document repository and that, before a given account holder with account holder access sets up the given guest user to have guest access via a guest setup interface, has no access to the document repository; and
    presenting the guest setup interface to account holder users to present, via a computer screen, guest parameter graphical tools to plural account holder users having only non-owner account holder access to the repository, the guest parameter graphical tools being configured to receive via a given one of the non-owner account holders interacting with the computer screen, for the given guest user, guest user identifying information identifying the given guest user and associated access parameters specifying a type of access to be given to the given guest user.

* * * * *